US012129432B1

(12) United States Patent
Hou et al.

(10) Patent No.: US 12,129,432 B1
(45) Date of Patent: Oct. 29, 2024

(54) FUNCTIONALIZED MOLYBDENUM DISULFIDE NANOSHEET AND ITS PREPARATION METHOD AND APPLICATION

(71) Applicant: CHINA UNIVERSITY OF PETROLEUM-BEIJING, Beijing (CN)

(72) Inventors: Jirui Hou, Beijing (CN); Infant Raj, Beijing (CN); Yuchen Wen, Beijing (CN); Zhuo Lu, Beijing (CN); Lixiao Xiao, Beijing (CN)

(73) Assignee: China University of Petroleum-Beijing, Beijing (CN)

( * ) Notice: Subject to any disclaimer, the term of this patent is extended or adjusted under 35 U.S.C. 154(b) by 0 days.

(21) Appl. No.: 18/372,581

(22) Filed: Sep. 25, 2023

(30) Foreign Application Priority Data

Aug. 4, 2023 (CN) ........................ 202310982294.1

(51) Int. Cl.

| | |
|---|---|
| ***C09K 8/584*** | (2006.01) |
| ***C09C 1/00*** | (2006.01) |
| ***C09C 3/08*** | (2006.01) |
| ***C09C 3/10*** | (2006.01) |
| ***C09K 8/588*** | (2006.01) |
| ***E21B 43/16*** | (2006.01) |

(52) U.S. Cl.

CPC ............ *C09K 8/584* (2013.01); *C09C 1/0003* (2013.01); *C09C 3/08* (2013.01); *C09C 3/10* (2013.01); *C09K 8/588* (2013.01); *E21B 43/16* (2013.01); *C01P 2002/82* (2013.01); *C01P 2004/03* (2013.01); *C01P 2004/24* (2013.01); *C09K 2208/10* (2013.01)

(58) Field of Classification Search

None

See application file for complete search history.

(56) References Cited

U.S. PATENT DOCUMENTS

| | | | | |
|---|---|---|---|---|
| 10,344,554 | B2 * | 7/2019 | Mazyar | E21B 33/1208 |
| 10,384,178 | B2 * | 8/2019 | Baseeth | A61K 8/4993 |
| 11,214,728 | B2 * | 1/2022 | Xiao | E21B 43/16 |
| 2015/0176363 | A1 * | 6/2015 | Mazyar | E21B 23/06 264/41 |
| 2020/0181478 | A1 * | 6/2020 | Xiao | C09C 1/00 |

* cited by examiner

*Primary Examiner* — John J Figueroa

(74) *Attorney, Agent, or Firm* — Davis Wright Tremaine LLP

(57) ABSTRACT

A functionalized molybdenum disulfide nanosheet and its preparation method and application, where the preparation method includes steps below: mixing a solvent, 1 part by weight of lipoic acid and 5-10 parts by weight of a first compound for 2-4 h to obtain a mixture; adding 0.05-0.1 parts by weight of 1-hydroxybenzotriazole into the mixture, mixing for 24-48 h, and drying to obtain an intermediate product; performing ultrasonic treatment or heat treatment on a raw material-solution system to obtain a functionalized molybdenum disulfide nanosheet, where the raw material-solution system includes 5-10 parts by weight of the molybdenum disulfide nanosheet, 1 part by weight of the intermediate product and saline water, the first compound contains an ethylene oxide group and an alkylamine chain, the number of carbon atoms in the alkylamine chain is 12-18, and the number of the ethylene oxide group is 2-15.

19 Claims, 3 Drawing Sheets

FUNCTIONALIZED MOLYBDENUM DISULFIDE NANOSHEET AND ITS PREPARATION METHOD AND APPLICATION

CROSS-REFERENCE TO RELATED APPLICATION

This application claims priority to Chinese Patent Application No. 2023109822941, filed on Aug. 4, 2023, which is hereby incorporated by reference in its entirety.

TECHNICAL FIELD

The present disclosure relates to a functionalized molybdenum disulfide nanosheet and its preparation method and application, belonging to the technical field of petroleum exploitation.

BACKGROUND

With rapid development of China's petrochemical industry, the demand for petroleum resources is increasing. How to improve petroleum oil recovery is a very important link in the process of petroleum development, and has great potential economic value. With the exploitation of petroleum, the proportion of low-permeability oil fields in China will become larger and larger, there is an urgent need to effectively solve the problem of exploitation of the low-permeability oil fields and promote the development of China's petroleum industry.

At present, the development of reservoirs mainly includes three stages: primary oil recovery, secondary oil recovery, and enhanced oil recovery. A total oil recovery of the primary oil recovery and the secondary oil recovery is only 50-60%, and a large amount of oil is trapped in the reservoir. Therefore, enhanced oil recovery must be carried out to further improve the oil recovery. Enhanced oil recovery (EOR) usually uses various physical, chemical, or thermal methods to increase the fluidity of oil in the reservoir, thereby improving a oil recovery, where a chemical method, which is one of the commonly used methods to improve the oil recovery, usually injecting components such as polymer, surfactant, or a combination of the two into the reservoir to change the property of the oil or rock, so that the oil mobility is stronger in order to improve the oil recovery. However, the polymer will clog the formation, causing irreversible damage to the reservoir: furthermore, adding nanoparticles or functional nanoparticles to change the wettability of the rock, reduce interfacial tension, and increase the viscosity of injected fluid to improve the oil recovery. Currently, nanomaterials used for oil displacement include graphene, nanometal oxides, and some nano-nonmetallic oxides, which generally have defects such as high cost, poor dispersion stability, and limited effect in improving the oil recovery.

SUMMARY

In view of the above defects, the present disclosure provides a preparation method of a functionalized molybdenum disulfide nanosheet. The functionalized molybdenum disulfide nanosheet obtained by the preparation method has large specific surface area and low surface tension. The as-prepared nanofluid is found to have a strong stability under saline condition. It greatly improves the oil recovery at the low-permeability region of the reservoir, and the nanofluid can be prepared using seawater near the reservoir which could drastically reduce the cost.

The present disclosure provides a functionalized molybdenum disulfide nanosheet, which is prepared by the above method, and the surface of which contains a large number of hydrophilic ethylene oxide groups and hydrophobic alkylamine chains, so that the interfacial tension between oil and water can be reduced, thereby greatly improving oil recovery.

The present disclosure provides a nanofluid, which includes the above functionalized molybdenum disulfide nanosheet, and thus is capable of effectively improving the oil recovery in low-permeability reservoirs, thereby improving the efficiency of oil recovery operations.

The present disclosure provides a displacement method, which realizes the purpose of improving the oil recovery by injecting a nanofluid including a functionalized molybdenum disulfide nanosheet into a reservoir.

The present disclosure provides a preparation method for a functionalized molybdenum disulfide nanosheet, including the following steps:

1) mixing a solvent, 1 part by weight of lipoic acid and 5-10 parts by weight of a first compound for 2-4 h to obtain a mixture;
2) adding 0.05-0.1 parts by weight of 1-hydroxybenzotriazole into the mixture, mixing for 24-48 h, and drying to obtain an intermediate product;
3) performing an ultrasonic treatment or a heat treatment on a raw material-solution system to obtain the functionalized molybdenum disulfide nanosheet;

the raw material-solution system includes 5-10 parts by weight of a molybdenum disulfide nanosheet, 1 part by weight of the intermediate product and saline water;

the first compound contains an ethylene oxide group and an alkylamine chain; and the number of carbon atoms in the alkylamine chain in the first compound is 12 to 18, and the number of the ethylene oxide group is 2 to 15.

Further, in step 3), the ultrasonic treatment includes ultrasonication on the raw material-solution system for 4-12 hh and then stirring for 24-48 h:

the heat treatment includes reacting the raw material-solution system at 60-80° C. for 24-48 h.

Further, the molybdenum disulfide nanosheet has a layer thickness of 1-1.5 nm, a length of 50-100 nm and a width of 50-100 nm.

Further, the first compound includes at least one of tallow amine polyoxyethylene ether compounds, octadecylamine polyoxyethylene ether compounds and coconut amine polyoxyethylene ether compounds.

The present disclosure also provides a functionalized molybdenum disulfide nanosheet, which is prepared by the preparation method for a functionalized molybdenum disulfide nanosheet described in any one of the above embodiments.

The present disclosure furuther provides a nanofluid, including the functionalized molybdenum disulfide nanosheet prepared in any one of the above preparation methods or the functionalized molybdenum disulfide nanosheet described above.

Further, the functionalized molybdenum disulfide nanosheet has a concentration of 10-1000 ppm.

Further, the nanofluid has an oil/water interfacial tension of $10^{-3}$-$10^{-2}$ mN/m.

Further, the nanofluid includes one of saline water and deionized water;

the saline water has a concentration of 10000-220000 mg/L.

The present disclosure further provides a displacement method for recovering a reservoir using the nanofluid as described in any one of the above embodiments.

In the present disclosure, a first compound containing an ethylene oxide group and an alkylamine chain, lipoic acid and a molybdenum disulfide nanosheet as raw materials, and 1-hydroxybenzotriazole as catalyst are used to prepare a functionalized molybdenum disulfide nanosheet, the number of carbon atoms in the alkylamine chain of the first compound is 12-18, and the number of the ethylene oxide group is 2-15. The functionalized molybdenum disulfide nanosheet includes the ethylene oxide group with hydrophilicity and the alkylamine chain with hydrophobicity, and when it is applied to a nanofluid, ethylene oxide group and the alkylamine chain act synergistically, reducing the oil/water interfacial tension and thereby improving the oil recovery. Furthermore, the functionalized molybdenum disulfide nanosheet is in the form of flakes, and thus the nanofluid has high recovery and stability even under a low-permeability reservoir, and at the same time, the nanofluid can be prepared using seawater near the reservoir to reduce the cost of water consumption.

DESCRIPTION OF EMBODIMENTS

Figure 1:
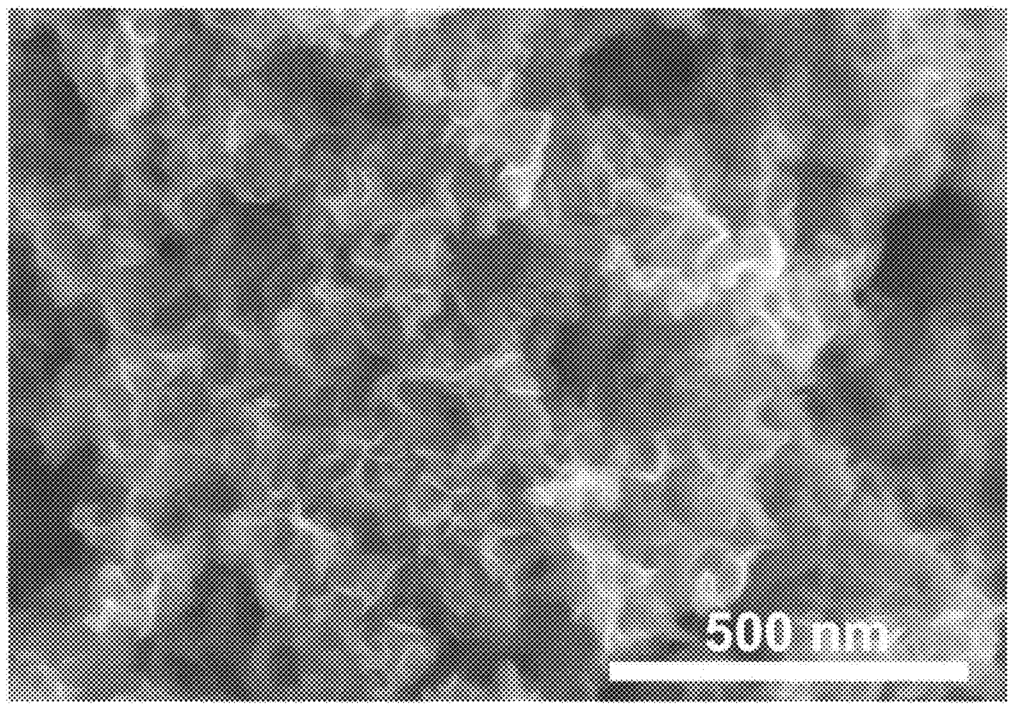
FIG. 1 is a SEM image of a molybdenum disulfide nanosheet in Example 3 of the present disclosure.

To make the objects, technical solutions and advantages of the present disclosure more clear, the technical solutions in the embodiments of the present disclosure will be described clearly and completely in the following. Obviously, the described embodiments are part of the embodiments of the present disclosure, but not all of them. Based on the embodiments in the present disclosure, all other embodiments obtained by a person skilled in the art without creative labor belong to the scope of protection of the present disclosure.

A first aspect of the present disclosure provides a preparation method of a functionalized molybdenum disulfide nanosheet, which includes the following steps:

1) mixing a solvent, 1 part by weight of lipoic acid and 5-10 parts by weight of a first compound for 2-4 h to obtain a mixture;
2) adding 0.05-0.1 parts by weight of 1-hydroxy benzotriazole into the mixture, mixing for 24-48 h, and drying to obtain an intermediate product;
3) performing an ultrasonic treatment or a heat treatment on a raw material-solution system to obtain the functionalized molybdenum disulfide nanosheet;

the raw material-solution system includes 5-10 parts by weight of a molybdenum disulfide nanosheet, 1 part by weight of the intermediate product and saline water;

the first compound contains an ethylene oxide group and an alkylamine chain;

the number of carbon atoms in the alkylamine chain in the first compound is 12-18, and the number of the ethylene oxide group is 2-15.

Specifically, in step 1), an alkyl group in the alkylamine chain of the first compound is a straight chain, and an amino group therein is imino group —NH—. In this process, lipoic acid is fully mixed with the first compound, which lays a foundation for a subsequent dehydration-condensation reaction.

The present disclosure does not too limit the type of the solvent too much, for example, it can be selected from at least one of ethanol, dichloromethane and N,N-dimethylformamide. When the aforementioned solvent is a mixture of a plurality of specific compounds, the present disclosure does not limit the ratio between the specific compounds too much.

In step 2), 1-hydroxybenzotriazole acts as a catalyst to promote the dehydration condensation reaction between lipoic acid and the first compound so as to produce the intermediate product.

In step 3), the raw material-solution system is subjected to an ultrasonic treatment or a heat treatment, and then dried to obtain the functionalized molybdenum disulfide nanosheet; in this process, since the molybdenum disulfide nanosheet has sulfur defects, S atoms in the intermediate product can be attached to vacancies of the defect, so that the intermediate product can be successfully grafted onto a surface of the molybdenum disulfide nanosheet, to obtain the functionalized molybdenum disulfide nanosheet.

The present disclosure does not limit the preparation method of the molybdenum disulfide nanosheet. For example, the molybdenum disulfide nanosheet is prepared by a method including the following process:

mixing a molybdenum source, a sulfur source and a reducing agent in deionized water, reacting at high temperature and high pressure to obtain a precipitated product, washing the precipitated product with water and ethanol, and drying to obtain the molybdenum disulfide nanosheet.

The present disclosure does not specifically limit the types of the molybdenum source, the sulfur source and the reducing agent. For example, the molybdenum source is selected from at least one of molybdenum oxide and ammonium molybdate, the sulfur source is selected from at least one of thioacetamide and thiourea, and the reducing agent is selected from at least one of ascorbic acid and urea. When the above three types of compounds each are a mixture of a plurality of specific compounds, the present disclosure does not limit the ratio between individual specific compounds too much.

The present disclosure does not specifically limit a concentration of the saline water and a salt in the saline water. For example, the concentration of the saline water is 10,000-220,000 mg/L, and the salt in the saline water can be selected from at least one of sodium chloride, calcium chloride, magnesium chloride, sodium sulfate and sodium bicarbonate. When the salt is selected from two or more of the aforementioned compounds, the present disclosure does not limit the ratio between individual specific compounds too much.

The present disclosure does not specifically limit drying temperature and drying time, as long as the intermediate product and the functionalized molybdenum disulfide nanosheet product are completely dried.

The present disclosure does not limit a source of each component, a commercially available product well known to those skilled in the art or a product prepared by a conventional preparation method can be adopted.

In the preparation method of the functionalized molybdenum disulfide nanosheet according to the present disclosure, a first compound containing an ethylene oxide group and an alkylamine chain is attached to a surface of a molybdenum disulfide nanosheet through lipoic acid as linker to obtain a functionalized molybdenum disulfide nanosheet, where the number of carbon atoms in the alkylamine chain is 12-18, and the number of the ethylene oxide group is 2-15. The alkylamine chain on the surface of the prepared functionalized molybdenum disulfide nanosheet is hydrophobic, and the ethylene oxide group thereon is hydrophilic, and both of them act synergistically. Specifically, the alkylamine chain is hydrophobic and lipophilic, and can interacts with an oil phase; and the ethylene oxide group is hydrophilic and oleophobic, and can interacts with a water molecule through hydrogen bonding or other electrostatic interaction, and this interaction destroys the cohesion between water molecules and reduces the interfacial tension between oil and water, thus improving oil recoveryt. And the functionalized molybdenum disulfide nanosheet is in shape of flake, can enter a small pore throat structure in the stratum, and also has good oil recovery enhancement effect in low-permeability reservoirs: meanwhile, the nanosheet forms "surface-to-surface contact" with the oil/water interface, having an extreme strong interface effect, so that the oil recovery in low-permeability reservoirs can be further improved. At the same time, since the functionalized molybdenum disulfide nanosheet contains more ethylene oxide groups, the formed nanofluid has good stability and still has good stability under the action of highly mineralized water, so the nanofluid can be prepared using seawater near a reservoir to achieve the purpose of reducing the cost.

In addition, the preparation method is simple and convenient in operation, and the whole preparation process can also be carried out at room temperature and normal pressure, with low danger and an advantage of low energy consumption.

In a specific embodiment, in step 3), the ultrasonic treatment includes ultrasonication on the raw material-solution system for 4-12 h and then stirring for 24-48 h;

the heat treatment includes reacting the raw material-solution system at 60-80° C. for 24-48 h. When the time and stirring time in the ultrasonic treatment, or the reaction temperature, reaction time and stirring time in the heat treatment are within the above ranges, the sulfur defects on the molybdenum disulfide nanosheet can better react with the S atoms in the intermediate product, to improve the grafting rate of the molybdenum disulfide nanosheet.

The present disclosure does not specifically limit the stirring method. For example, the mixing can be performed by magnetic stirring or mechanical stirring.

In a specific embodiment, the molybdenum disulfide nanosheet has a layer thickness of 1-1.5 nm, a length of 50-100 nm and a width of 50-100 nm. When the size of the molybdenum disulfide nanosheet is in the above-mentioned range, the size of the finally obtained product, the functionalized molybdenum disulfide nanosheet, is also in the above-mentioned range. When the size of the functionalized molybdenum disulfide nanosheet is in the above-mentioned range, the nanofluid including the functionalized molybdenum disulfide are more likely to enter the smaller pore throat structure, thereby improving the oil recovery of the nanofluid in low-permeability reservoirs.

The present disclosure does not limit the first compound too much, for example, it can be selected from at least one of tallow amine polyoxyethylene ether compounds, octadecylamine polyoxyethylene ether compounds and coconut amine polyoxyethylene ether compounds. It can be understood that the above three types of compounds include a number of specific compounds, and the selected compounds in the present disclosure all conform to the fact that the number of carbon atoms in the alkylamine chain is 12-18 and the number of the ethylene oxide group is 2-15. Specifically; tallow amine polyoxyethylene ether compounds include PEG-5-tallow amine, PEG-10-tallow amine and PEG-15-tallow amine, octadecylamine polyoxyethylene ether compounds include PEG-5-stearylamine, PEG-10-stearylamine and PEG-15-stearylamine, and the coconut amine polyoxyethylene ether compounds include PEG-5-coconut amine, PEG-10-coconut amine and PEG-15-coconut amine. When the first compound is a mixture of a plurality of specific compounds, the present disclosure does not limit the ratio between the specific compounds too much.

A second aspect of the present disclosure provides a functionalized molybdenum disulfide nanosheet, which is prepared by any one of the preparation methods of the functionalized molybdenum disulfide nanosheet. The functionalized molybdenum disulfide nanosheet contains a hydrophilic ethylene oxide group and a hydrophobic alkylamine chain, and when it is applied to a nanofluid, the interfacial tension between oil and water can be significantly reduced, and the stability can be enhanced, thereby improving the oil recovery. At the same time, due to its flake-like structure, it can still have a good oil displacement effect in low-permeability reservoirs, and a nanofluid including the functionalized molybdenum disulfide nanosheet can be prepared using seawater near the reservoir, which has the characteristic of low cost.

A third aspect of the present disclosure provides a nanofluid, which includes the functionalized molybdenum disulfide nanosheet prepared by any one of the above preparation methods or the functionalized molybdenum disulfide nanosheet described above. As the functionalized molybdenum disulfide nanosheet included in the nanofluid contain the ethylene oxide group and the alkylamine chain, where the ethylene oxide group is hydrophilic and oleophobic, and the alkylamine chain is hydrophobic and oleophilic, the ethylene oxide group and the alkylamine chain act synergistically, reducing the surface tension between oil and water and thereby improving the oil recovery, and at the same time, the nanofluid has high oil recovery and stability under low-permeability reservoirs, and can be prepared using seawater near the reservoirs, reducing the cost.

It can be understood that there are other components besides the functionalized molybdenum disulfide nanosheet. In a specific embodiment, the concentration of the functionalized molybdenum disulfide nanosheet is 10-1000 ppm. In this concentration range, the nanofluid including the functionalized molybdenum disulfide nanosheet can achieve lower oil/water interfacial tension and better oil displacement effect.

In a specific embodiment, the oil/water interfacial tension of the nanofluid is $10^{-3}$-$10^{-2}$ mN/m. Specifically, the concentration of the functionalized molybdenum disulfide nanosheet in the nanofluid can be controlled such that the the oil/water interfacial tension of the nanofluid is within the aforementioned range, thereby enabling the nanofluid to have a high oil recovery.

In a specific embodiment, the nanofluid further includes one of saline water and deionized water; a concentration of the saline water is 10000-220000 mg/L. When the concentration of the saline water is in the above range, it will not adversely affect the ethylene oxide group in the functionalized molybdenum disulfide nanosheet and their hydrophilicity, so that the hydrophilic ethylene oxide group and the hydrophobic alkylamine chain can act synergistically better, and thus the nanofluid including the functionalized molybdenum disulfide nanosheet has better stability. The saline water in the present disclosure further includes water produced from the reservoirs, which can further reduce the cost of water consumption.

The present disclosure does not specifically limit the type of salt in the saline water, for example, it can be selected from at least one of sodium chloride, calcium chloride, magnesium chloride, sodium sulfate and sodium bicarbonate. When the salt is selected from two or more of the aforementioned compounds, the present disclosure does not limit the ratio of individual specific compounds too much.

A fourth aspect of the present disclosure provides a displacement method, which uses the nanofluid of the third aspect to recover the reservoirs. The nanofluid used in this displacement method includes the functionalized molybdenum disulfide nanosheet, a surface of the nanosheet is attached with a hydrophilic ethylene oxide group and a hydrophobic alkylamine chain, and the hydrophilic ethylene oxide group and the hydrophobic alkylamine chain act synergistically, influence each other and interact with water and oil respectively, which can reduce the interfacial tension between water and oil and thus improve the oil recovery. At the same time, the flake-like structure of the nanosheet may help the nanofluid to achieve high oil recovery and stability in low-permeability reservoirs, and the nanofluid can be prepared using seawater near a reservoir or water produced from a reservoir, which can reduce the cost.

Specifically, the nanofluid of the third aspect is continuously or alternately injected into a reservoir, so as to reduce the interfacial tension between the reservoir and water, improve the oil displacement efficiency, and thus improve the oil recovery, realizing the recovery of the reservoir.

Hereinafter, the nanofluid including the functionalized molybdenum disulfide nanosheet of the present disclosure will be introduced in detail through specific examples.

Example 1

1) Ethanol, 1 part by weight of lipoic acid and 5 parts by weight of PEG-5-tallow amine are mixed for 2 h to obtain a mixture, where PEG-5-tallow amine contains an ethylene oxide group and an alkylamine chain, and specifically, the number of carbon atoms in the alkylamine chain and the number of the ethylene oxide group are shown in Table 2;
2) adding 0.1 parts by weight of 1-hydroxy benzotriazole into the mixture above, magnetically stirring for 24 h, and drying at 80° C. to obtain an intermediate product;
3) preparing a saline water containing aqueous solution of sodium chloride, calcium chloride, magnesium chloride, sodium bicarbonate and sodium sulfate, where a mass ratio of sodium chloride, calcium chloride, magnesium chloride, sodium bicarbonate and sodium sulfate is 500:99:8:14:1, and a concentration of the saline water is 39186 mg/L;
4) adding 10 parts by weight of the molybdenum disulfide nanosheet and 1 part by weight of the intermediate product into the above saline water, processing under ultrasonication for 4 h, then stirring for 24 h, and drying at 80° C. to obtain a functionalized molybdenum disulfide nanosheet of this embodiment, where the molybdenum disulfide nanosheet has a layer thickness of 1.2 nm, a length of 80 nm, and a width of 60 nm;
5) mixing the functionalized molybdenum disulfide nanosheet prepared above and the above saline water, where a concentration of the functionalized molybdenum disulfide nanosheet is 500 ppm, and then processing under ultrasonication for 4 h, and then magnetically stirring for 24 h to obtain a nanofluid of the present embodiment.

Example 2

1) Mixing ethanol, 1 part by weight of lipoic acid and 5 parts by weight of PEG-10-tallow amine for 2 h to obtain a mixture, where PEG-10-tallow amine contains an ethylene oxide group and an alkylamine chain, and specifically, the number of carbon atoms in the alkylamine chain and the number of the ethylene oxide group are shown in Table 2;
2) adding 0.1 parts by weight of 1-hydroxy benzotriazole into the mixture, magnetically stirring for 24 h, and drying at 80° C. to obtain an intermediate product;
3) preparing a saline water containing aqueous solution of sodium chloride, calcium chloride, magnesium chloride, sodium bicarbonate and sodium sulfate, where a mass ratio of sodium chloride, calcium chloride, magnesium chloride, sodium bicarbonate and sodium sulfate is 500:99:8:14:1, and a concentration of the saline water is 39186 mg/L;
4) adding 10 parts by weight of the molybdenum disulfide nanosheet and 1 part by weight of the intermediate product into the above saline water, processing under ultrasonication for 4 h, then stirring for 24 h, and drying at 80° C. to obtain a functionalized molybdenum disulfide nanosheet of this embodiment, where the molybdenum disulfide nanosheet has a layer thickness of 1.2 nm, a length of 80 nm, and a width of 60 nm;
5) mixing the functionalized molybdenum disulfide nanosheet prepared above and the above saline water, where a concentration of the functionalized molybdenum disulfide nanosheet is 500 ppm, and then processing under ultrasonication for 4 h, and then magnetically stirring for 24 h to obtain a nanofluid of the present embodiment.

Example 3

1) Mixing ethanol, 1 part by weight of lipoic acid and 5 parts by weight of PEG-15-tallow amine for 2 h to obtain a mixture, where PEG-15-tallow amine contains an ethylene oxide group and an alkylamine chain, and specifically, the number of carbon atoms in the alkylamine chain and the number of the ethylene oxide group are shown in Table 2;
2) adding 0.1 parts by weight of 1-hydroxybenzotriazole into the mixture, magnetically stirring for 24 h, and drying at 80° C. to obtain an intermediate product;

3) preparing a saline water containing aqueous solution of sodium chloride, calcium chloride, magnesium chloride, sodium bicarbonate and sodium sulfate, where a mass ratio of sodium chloride, calcium chloride, magnesium chloride, sodium bicarbonate and sodium sulfate is 500:99:8:14:1, and a concentration of the saline water is 39186 mg/L;
4) adding 10 parts by weight of the molybdenum disulfide nanosheet and 1 part by weight of the intermediate product into the above saline water, processing under ultrasonication for 4 h, then stirring for 24 h, and drying at 80° C. to obtain a functionalized molybdenum disulfide nanosheet of this embodiment, where the molybdenum disulfide nanosheet has a layer thickness of 1.2 nm, a length of 80 nm, and a width of 60 nm, the molybdenum disulfide nanosheet was tested by Scanning Electron Microscope (SEM), and the test results are shown in FIG. 1;
5) mixing the functionalized molybdenum disulfide nanosheet prepared above and the above saline water, where a concentration of the functionalized molybdenum disulfide nanosheet is 500 ppm, and then processing under ultrasonication for 4 h, and then magnetically stirring for 24 h to obtain a nanofluid of the present embodiment.

Example 4

1) Mixing ethanol, 1 part by weight of lipoic acid and 5 parts by weight of PEG-15-coconut amine for 2 h to obtain a mixture, where PEG-15-coconut amine contains an ethylene oxide group and an alkylamine chain, and specifically, the number of carbon atoms in the alkylamine chain and the number of the ethylene oxide group are shown in Table 2;
2) adding 0.1 parts by weight of 1-hydroxybenzotriazole into the mixture, magnetically stirring for 24 h, and drying at 80° C. to obtain an intermediate product;
3) preparing a saline water containing aqueous solution of sodium chloride, calcium chloride, magnesium chloride, sodium bicarbonate and sodium sulfate, where a mass ratio of sodium chloride, calcium chloride, magnesium chloride, sodium bicarbonate and sodium sulfate is 500:99:8:14:1, and a concentration of the saline water is 39186 mg/L;
4) adding 10 parts by weight of the molybdenum disulfide nanosheet and 1 part by weight of the intermediate product into the above saline water, processing under ultrasonication for 4 h, then stirring for 24 h, and drying at 80° C. to obtain a functionalized molybdenum disulfide nanosheet of this embodiment, where the molybdenum disulfide nanosheet has a layer thickness of 1.2 nm, a length of 80 nm, and a width of 60 nm;
5) mixing the functionalized molybdenum disulfide nanosheet prepared above and the above saline water, where a concentration of the functionalized molybdenum disulfide nanosheet is 500 ppm, and then processing under ultrasonication for 4 h, and then magnetically stirring for 24 h to obtain a nanofluid of the present embodiment.

Example 5

1) Mixing ethanol, 1 part by weight of lipoic acid and 5 parts by weight of PEG-15-tallow amine for 2 h to obtain a mixture, where PEG-15-tallow amine contains an ethylene oxide group and an alkylamine chain, and specifically, the number of carbon atoms in the alkylamine chain and the number of the ethylene oxide group are shown in Table 2;
2) adding 0.1 parts by weight of 1-hydroxybenzotriazole into the mixture, magnetically stirring for 24 h, and drying at 80° C. to obtain an intermediate product;
3) preparing a saline water containing aqueous solution of sodium chloride, calcium chloride, magnesium chloride, sodium bicarbonate and sodium sulfate, where a mass ratio of sodium chloride, calcium chloride, magnesium chloride, sodium bicarbonate and sodium sulfate is 500:99:8:14:1, and a concentration of the saline water is 39186 mg/L;
4) adding 10 parts by weight of the molybdenum disulfide nanosheet and 1 part by weight of the intermediate product into the above saline water, processing under ultrasonication for 4 h, then stirring for 24 h, and drying at 80° C. to obtain a functionalized molybdenum disulfide nanosheet, where the molybdenum disulfide nanosheet has a layer thickness of 1.2 nm, a length of 80 nm, and a width of 60 nm;
5) mixing the functionalized molybdenum disulfide nanosheet prepared above and the above saline water, where a concentration of the functionalized molybdenum disulfide nanosheet is 2000 ppm, and then processing under ultrasonication for 4 h, and then magnetically stirring for 24 h to obtain a nanofluid of the present embodiment.

Example 6

1) Mixing ethanol, 1 part by weight of lipoic acid and 8 parts by weight of PEG-15-tallow amine for 4 h to obtain a mixture, where PEG-15-tallow amine contains an ethylene oxide group and an alkylamine chain, and specifically, the number of carbon atoms in the alkylamine chain and the number of the ethylene oxide group are shown in Table 2;
2) adding 0.08 part by weight of 1-hydroxybenzotriazole into the mixture, magnetically stirring for 48 h, and drying at 80° C. to obtain an intermediate product;
3) preparing a saline water containing aqueous solution of sodium chloride, calcium chloride, magnesium chloride, sodium bicarbonate and sodium sulfate, where a mass ratio of sodium chloride, calcium chloride, magnesium chloride, sodium bicarbonate and sodium sulfate is 500:99:8:14:1, and a concentration of the saline water is 39186 mg/L;
4) adding 8 parts by weight of the molybdenum disulfide nanosheet and 1 part by weight of the intermediate product into the above saline water, processing under ultrasonication for 6 h, then stirring for 36 h, and drying at 80° C. to obtain a functionalized molybdenum disulfide nanosheet of this embodiment, where the molybdenum disulfide nanosheet has a layer thickness of 1.2 nm, a length of 80 nm, and a width of 60 nm;
5) mixing the functionalized molybdenum disulfide nanosheet prepared above and the above saline water, where a concentration of the functionalized molybdenum disulfide nanosheet is 500 ppm, and then processing under ultrasonication for 6 h, and then magnetically stirring for 36 h to obtain a nanofluid of the present embodiment.

Example 7

1) Mixing ethanol, 1 part by weight of lipoic acid and 5 parts by weight of PEG-15-tallow amine for 2 h to obtain a mixture, where PEG-15-tallow amine contains an ethylene oxide group and an alkylamine chain, and specifically, the number of carbon atoms in the alkylamine chain and the number of the ethylene oxide group are shown in Table 2;

2) adding 0.1 parts by weight of 1-hydroxybenzotriazole into the mixture, magnetically stirring for 24 h, and drying at 80° C. to obtain an intermediate product; 3) preparing a saline water containing aqueous solution of sodium chloride, calcium chloride, magnesium chloride, sodium bicarbonate and sodium sulfate, where a mass ratio of sodium chloride, calcium chloride, magnesium chloride, sodium bicarbonate and sodium sulfate is 500:99:8:14:1, and then preparing saline waters with concentrations of 39186 mg/L and 300,000 mg/L, respectively;

4) adding 10 parts by weight of the molybdenum disulfide nanosheet and 1 part by weight of the intermediate product into the saline water with the concentration of 39186 mg/L, processing under ultrasonication for 4 h, then stirring for 24 h, and drying at 80° C. to obtain a functionalized molybdenum disulfide nanosheet of this embodiment, where the molybdenum disulfide nanosheet has a layer thickness of 1.2 nm, a length of 80 nm, and a width of 60 nm;

5) mixing the functionalized molybdenum disulfide nanosheet prepared above and the above saline water with the concentration of 300,000 mg/L, where a concentration of the functionalized molybdenum disulfide nanosheet is 500 ppm, and then processing under ultrasonication for 4 h, and then magnetically stirring for 24 h to obtain a nanofluid of the present embodiment.

Example 8

1) Mixing ethanol, 1 part by weight of lipoic acid and 5 parts by weight of PEG-15-tallow amine for 2 h to obtain a mixture, where PEG-15-tallow amine contains an ethylene oxide group and an alkylamine chain, and specifically, the number of carbon atoms in the alkylamine chain and the number of the ethylene oxide group are shown in Table 2;

2) adding 0.1 parts by weight of 1-hydroxybenzotriazole into the mixture, magnetically stirring for 24 h, and drying at 80° C. to obtain an intermediate product;

3) preparing a saline water containing aqueous solution of sodium chloride, calcium chloride, magnesium chloride, sodium bicarbonate and sodium sulfate, where a mass ratio of sodium chloride, calcium chloride, magnesium chloride, sodium bicarbonate and sodium sulfate is 500:99:8:14:1, and a concentration of the saline water is 39186 mg/L;

4) adding 10 parts by weight of the molybdenum disulfide nanosheet and 1 part by weight of the intermediate product into a flask, reacting for 24 h under water bath heating at 80° C., and after complete reaction, drying at 80° C. to obtain a functionalized molybdenum disulfide nanosheet of this embodiment, where the molybdenum disulfide nanosheet has a layer thickness of 1.2 nm, a length of 80 nm, and a width of 60 nm;

5) mixing the functionalized molybdenum disulfide nanosheet prepared above and the above saline water, where a concentration of the functionalized molybdenum disulfide nanosheet is 500 ppm, and then processing under ultrasonication for 4 h, and then magnetically stirring for 24 h to obtain a nanofluid of the present embodiment.

Comparative Example 1

1) Mixing ethanol, 1 part by weight of lipoic acid and 5 parts by weight of octadecylamine for 2 h to obtain a mixture, where the octadecylamine contains an alkylamine chain, and specifically, the number of carbon atoms in the alkylamine chain is shown in Table 2;

2) adding 0.1 parts by weight of 1-hydroxy benzotriazole into the mixture, magnetically stirring for 24 h, and drying at 80° C. to obtain an intermediate product;

3) preparing a saline water containing aqueous solution of sodium chloride, calcium chloride, magnesium chloride, sodium bicarbonate and sodium sulfate, where a mass ratio of sodium chloride, calcium chloride, magnesium chloride, sodium bicarbonate and sodium sulfate is 500:99:8:14:1, and a concentration of the saline water is 39186 mg/L;

4) adding 10 parts by weight of the molybdenum disulfide nanosheet and 1 part by weight of the intermediate product into the above saline water, processing under ultrasonication for 4 h, then stirring for 24 h, and drying at 80° C. to obtain a functionalized molybdenum disulfide nanosheet of the present comparative example, where the molybdenum disulfide nanosheet has a layer thickness of 1.2 nm, a length of 80 nm, and a width of 60 nm;

5) mixing the functionalized molybdenum disulfide nanosheet prepared above and the above saline water, where a concentration of the functionalized molybdenum disulfide nanosheet is 500 ppm, and then processing under ultrasonication for 4 h, and then magnetically stirring for 24 h to obtain a nanofluid of the present comparative example.

Comparative Example 2

1) Mixing ethanol, 1 part by weight of lipoic acid and 5 parts by weight of PEG-22-tallow amine for 2 h to obtain a mixture, where PEG-22-tallow amine contains an ethylene oxide group and an alkylamine chain, and specifically, the number of carbon atoms in the alkylamine chain and the number of the ethylene oxide group are shown in Table 2;

2) adding 0.1 parts by weight of 1-hydroxybenzotriazole into the mixture, magnetically stirring for 24 h, and drying at 80° C. to obtain an intermediate product;

3) preparing a saline water containing aqueous solution of sodium chloride, calcium chloride, magnesium chloride, sodium bicarbonate and sodium sulfate, where a mass ratio of sodium chloride, calcium chloride, magnesium chloride, sodium bicarbonate and sodium sulfate is 500:99:8:14:1, and a concentration of the saline water is 39186 mg/L;

4) adding 10 parts by weight of the molybdenum disulfide nanosheet and 1 part by weight of the intermediate product into the above saline water, processing under ultrasonication for 4 h, then stirring for 24 h, and drying at 80° C. to obtain a functionalized molybdenum disulfide nanosheet of the present comparative example, where the molybdenum disulfide nanosheet has a layer thickness of 1.2 nm, a length of 80 nm, and a width of 60 nm;

5) mixing the functionalized molybdenum disulfide nanosheet prepared above and the above saline water, where a concentration of the functionalized molybdenum disulfide nanosheet is 500 ppm, and then processing under ultrasonication for 4 h, and then magnetically stirring for 24 h to obtain a nanofluid of the present comparative example.

Comparative Example 3

1) Mixing ethanol, 1 part by weight of lipoic acid and 5 parts by weight of PEG-15-octylamine for 2 h to obtain a mixture, where PEG-15-octylamine contains an ethylene oxide group and an alkylamine chain, and specifically, the number of carbon atoms in the alkylamine chain and the number of the ethylene oxide group are shown in Table 2;
2) adding 0.1 parts by weight of 1-hydroxybenzotriazole into the mixture, magnetically stirring for 24 h, and drying at 80° C. to obtain an intermediate product;
3) preparing a saline water containing aqueous solution of sodium chloride, calcium chloride, magnesium chloride, sodium bicarbonate and sodium sulfate, where a mass ratio of sodium chloride, calcium chloride, magnesium chloride, sodium bicarbonate and sodium sulfate is 500:99:8:14:1, and a concentration of the saline water is 39186 mg/L;
4) adding 10 parts by weight of the molybdenum disulfide nanosheet and 1 part by weight of the intermediate product into the above saline water, processing under ultrasonication for 4 h, then stirring for 24 h, and drying at 80° C. to obtain a functionalized molybdenum disulfide nanosheet of the present comparative example, where the molybdenum disulfide nanosheet has a layer thickness of 1.2 nm, a length of 80 nm, and a width of 60 nm;
5) mixing the functionalized molybdenum disulfide nanosheet prepared above and the above saline water, where a concentration of the functionalized molybdenum disulfide nanosheet is 500 ppm, and then processing under ultrasonication for 4 h, and then magnetically stirring for 24 h to obtain a nanofluid of the present comparative example.

Comparative Example 4

1) Mixing ethanol, 1 part by weight of lipoic acid and 3 parts by weight of PEG-15-tallow amine for 1 h to obtain a mixture, where PEG-15-tallow amine contains an ethylene oxide group and an alkylamine chain, and specifically, the number of carbon atoms in the alkylamine chain and the number of the ethylene oxide group are shown in Table 2;
2) adding 0.01 parts by weight of 1-hydroxybenzotriazole into the mixture, magnetically stirring for 12 h, and drying at 80° C. to obtain an intermediate product;
3) preparing a saline water containing aqueous solution of sodium chloride, calcium chloride, magnesium chloride, sodium bicarbonate and sodium sulfate, where a mass ratio of sodium chloride, calcium chloride, magnesium chloride, sodium bicarbonate and sodium sulfate is 500:99:8:14:1, and a concentration of the saline water is 39186 mg/L;
4) adding 15 parts by weight of the molybdenum disulfide nanosheet and 1 part by weight of the intermediate product into the above saline water, processing under ultrasonication for 2 h, then stirring for 12 h, and drying at 80° C. to obtain a functionalized molybdenum disulfide nanosheet of the present comparative example, where the molybdenum disulfide nanosheet has a layer thickness of 1.2 nm, a length of 80 nm, and a width of 60 nm;
5) mixing the functionalized molybdenum disulfide nanosheet prepared above and the above saline water, where a concentration of the functionalized molybdenum disulfide nanosheet is 500 ppm, and then processing under ultrasonication for 2 h, and then magnetically stirring for 12 h to obtain a nanofluid of the present comparative example.

Test Example

1. The above Example 3 was subjected to SEM test and Fourier Transform Infrared Spectroscopy (FTIR) test, and the test results are shown in FIGS. 1-3.

Figure 2:
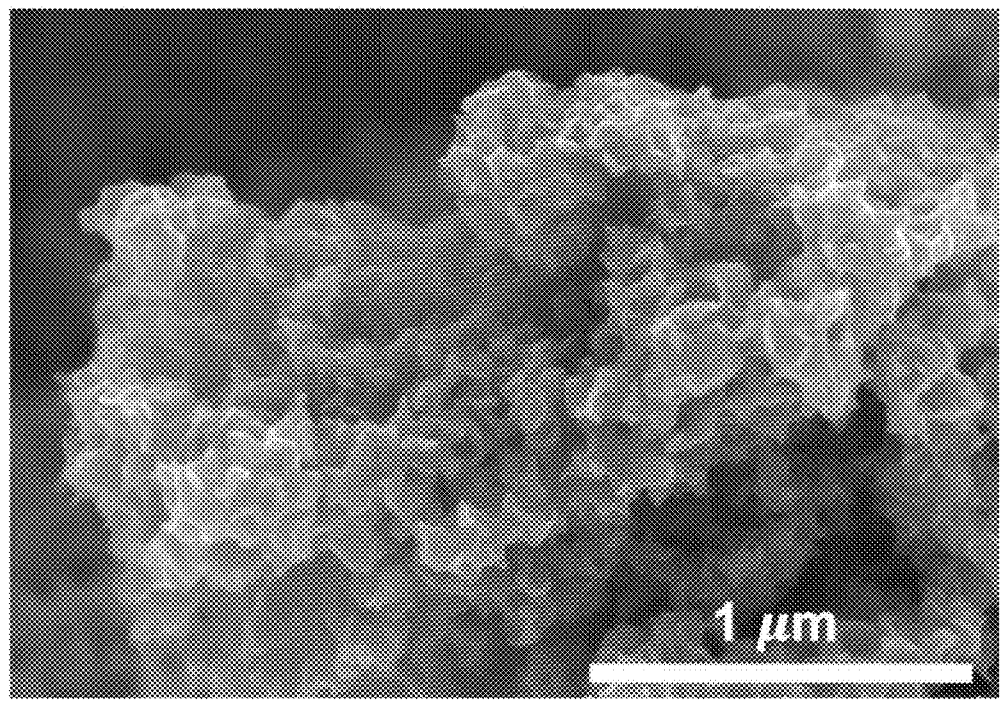
FIG. 2 is a SEM image of a functionalized molybdenum disulfide nanosheet in Example 3 of the present disclosure.
Figure 3:
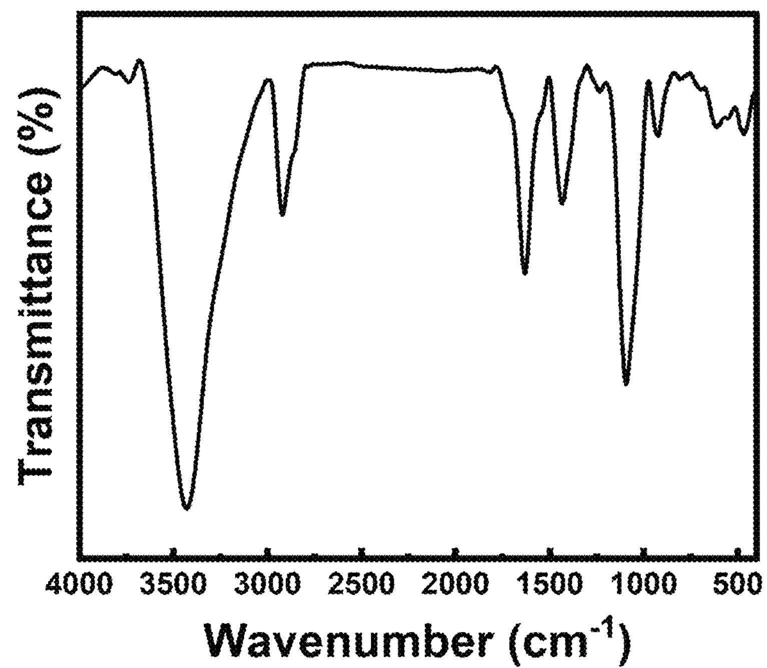
FIG. 3 is a FTIR image of a functionalized molybdenum disulfide nanosheet in Example 3 of the present disclosure.

FIGS. 1 and 2 are SEM images of the molybdenum disulfide nanosheet and the functionalized molybdenum disulfide nanosheet in Example 3, respectively. From FIGS. 1 and 2, it can be known that the functionalized molybdenum disulfide nanosheet has the same structure as an unfunctionalized molybdenum disulfide nanosheet without obvious changes. FIG. 3 is a FTIR spectrum of the functionalized molybdenum disulfide nanosheet prepared in Example 3. It can be seen from FIG. 3 that the wide band between 3700-3000 $cm^{-1}$ is caused by stretching of intermolecular and intramolecular hydrogen bonds O—H, the absorption peaks at 1632 $cm^{-1}$, 920 $cm^{-1}$, 620 $cm^{-1}$, and 460 $cm^{-1}$ are caused by molybdenum disulfide, the absorption peak at 1432 $cm^{-1}$ is caused by stretching of C—N in the amide group, and the absorption peak at 1096 $cm^{-1}$ is caused by C—O. Therefore, it can be known that, the functionalized molybdenum disulfide nanosheet was successfully synthesized.

2. Stability Test

The nanofluids prepared in Example 3 and Comparative Example 1 were tested by using a Turbiscan which is a stability analyzer ($\lambda$=880 nm), and the stability of the nanofluids was evaluated by using a Turbiscan Stability Index (TSI). The higher the TSI value, the more unstable the nanofluids are, and the test results are shown in FIG. 4.

Figure 4:
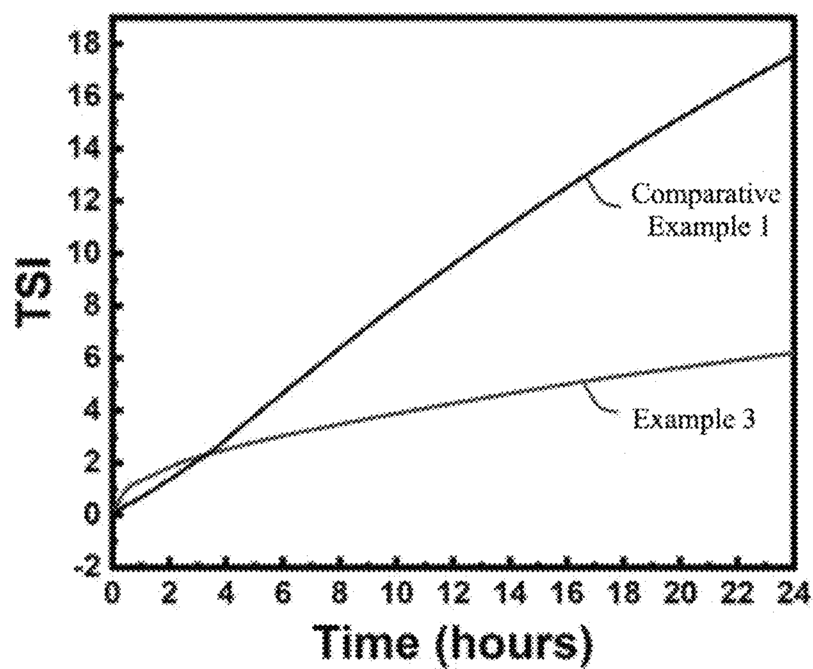
FIG. 4 is a relationship graph of stability of nanofluids over time in Example 3 and Comparative Example 1 of the present disclosure.

FIG. 4 shows stability curves of the nanofluids prepared in Example 3 and Comparative Example 1. It can be seen from FIG. 4 that the TSI value of the nanofluid in Example 3 is smaller than that of the nanofluid in Comparative Example 1, so the nanofluid in Example 3 has stronger stability.

3. Interfacial Tension Test

The oil/water interfacial tension of the nanofluids prepared in Examples 1-3 and Comparative Example 1 was tested at 30° C. by using a rotating drop interfacial tensiometer:

A crude oil and the above nanofluids were mixed at 30° C. with a rotating drop interfacial tensiometer, and were measured to obtain the interfacial tension between the two phases as a function of time, with time of 2 h. If a measured value changes within the range of 1-2%, a measurement result was recorded. The measurement results are shown in Table 2.

Figure 5:
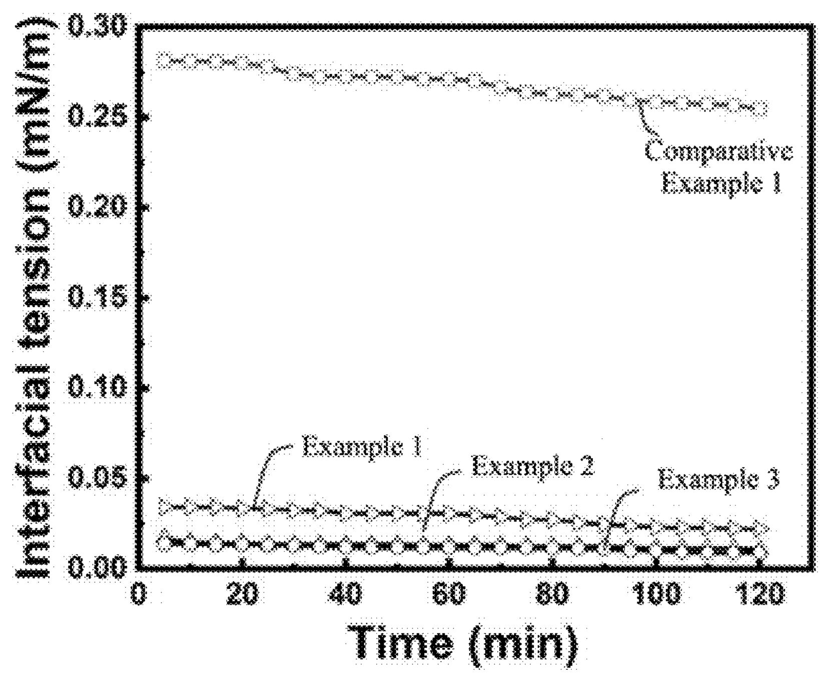
FIG. 5 is a relationship graph of an interfacial tension between a nanofluid and a crude oil over time in Examples 1-3 and Comparative Example 1 of the present disclosure.

FIG. 5 is a graph showing changes of interfacial tensions between nanofluids and crude oil in Examples 1-3 and Comparative Example 1 over time. It can be seen from FIG. 5 that Example 3 has the smallest interfacial tension, up to 0.006 mN/m, and Comparative Example 1 has the largest interfacial tension, up to 0.27 mN/m, which proves that the functionalized molybdenum disulfide nanosheet of the present disclosure is helpful to reduce the interfacial tension between oil and water.

4. Core Oil Displacement Test

The nanofluids prepared in the above examples and comparative examples were subjected to core oil displacement test. Sandstone cores were used as cores and tested in oil displacement equipment. The physical properties of core samples are shown in Table 1.

Before starting an oil displacement test, the core is saturated with water for 24 h. Then an oil with viscosity of 100 cP is pumped into the core, until no water flows out. At this time, the core reaches an oil saturation state, and a volume of crude oil pumped into the core when saturated, $V_0$, can be obtained. After oil saturation, water is injected at a rate of 0.3 mL/min until no more oil is recovered. At this time, a volume of crude oil displaced by water is recorded as $V_1$; then, a nanofluid is used for oil displacement, with the nanofluid being injected into the core at a rate of 0.3 mL/min until the remaining oil is recovered. The volume of crude oil displaced by the nanofluid is measured and recorded as $V_2$. Then the water-displaced oil recovery (secondary oil recovery), nanofluid-displaced oil recovery (enhanced oil recovery), and total oil recovery can be calculated using equations 1, 2, and 3, respectively:

$$\text{Water-displaced oil recovery (\%)}=V_1/V_0 \quad \text{(Equation 1)}$$

$$\text{Nanofluid-displaced oil recovery (\%)}=V_2/V_0 \quad \text{(Equation 2)}$$

$$\text{Total oil recovery (\%)}=(V_1+V_2)/V_0 \quad \text{(Equation 3)}$$

The test results are shown in Table 2.

Figure 6:
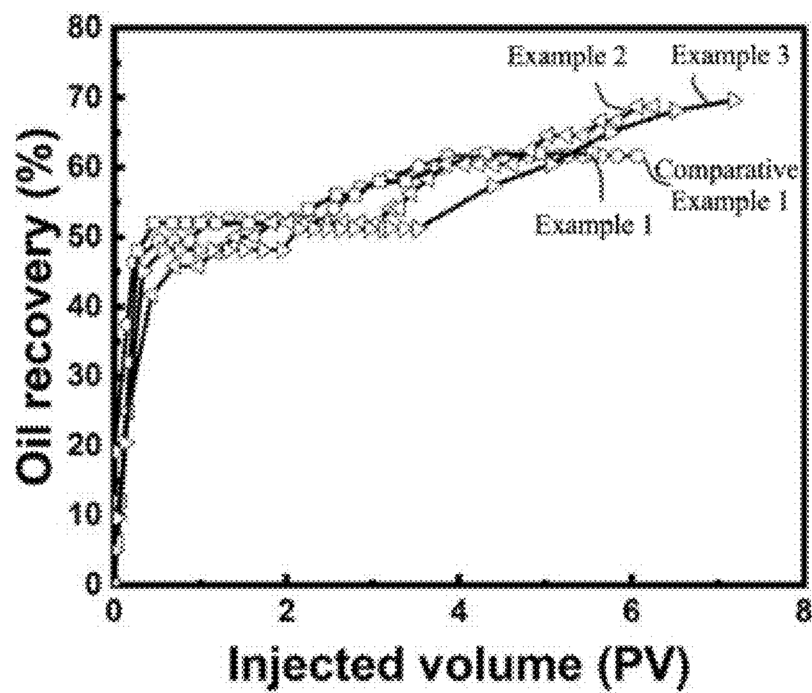
FIG. 6 is a graph of relationships between volumes of water and nanofluid, which are injected into a core pore volume, and oil recovery in Examples 1-3 and Comparative Example 1 of the present disclosure.

FIG. 6 shows relationship between volume of water and nanofluids injected into core pore and oil recovery in Examples 1-3 and Comparative Example 1.

TABLE 1

| | Diameter cm | Height cm | Porosity % | Permeability mD |
|---|---|---|---|---|
| Example 1 | 25.24 | 100.13 | 15.2 | 2.64 |
| Example 2 | 25.02 | 100.11 | 15 | 3.35 |
| Example 3 | 25.18 | 100.7 | 15.3 | 3.45 |
| Example 4 | 25.32 | 100.3 | 15.5 | 2.85 |
| Example 5 | 25.24 | 100.13 | 15.2 | 3.85 |
| Example 6 | 25.02 | 100.11 | 15 | 3.52 |
| Example 7 | 25.5 | 100.55 | 15.5 | 3.7 |
| Example 8 | 25.15 | 100.12 | 15.1 | 3.2 |
| Comparative Example 1 | 25.3 | 100.25 | 15.3 | 3.67 |
| Comparative Example 2 | 25.25 | 100.17 | 15.1 | 3.3 |
| Comparative Example 3 | 25.24 | 100.13 | 15.2 | 2.64 |
| Comparative Example 4 | 25.02 | 100.11 | 15 | 3.35 |

TABLE 2

| | Number of carbon atoms | Number of ethylene oxide group | Oil/water interfacial tension mN/m | Wate-displaced oil recovery % | Nanofluid-displaced oil recovery % | Total oil recovery % |
|---|---|---|---|---|---|---|
| Example 1 | 18 | 5 | 0.03 | 42.34 | 18.49 | 60.83 |
| Example 2 | 18 | 10 | 0.008 | 43.91 | 23.64 | 67.55 |
| Example 3 | 18 | 15 | 0.006 | 44.13 | 25.53 | 69.66 |
| Example 4 | 12 | 15 | 0.009 | 42.75 | 23 | 65.75 |
| Example 5 | 18 | 15 | 0.16 | 45.32 | 18.89 | 64.21 |
| Example 6 | 18 | 15 | 0.007 | 44.22 | 23.01 | 67.23 |
| Example 7 | 18 | 15 | 0.18 | 45.25 | 18.5 | 63.75 |
| Example 8 | 18 | 15 | 0.007 | 43.63 | 23.23 | 66.86 |
| Comparative Example 1 | 18 | 0 | 0.27 | 43.3 | 16.12 | 59.42 |
| Comparative Example 2 | 18 | 22 | 0.21 | 44.75 | 16.48 | 61.23 |
| Comparative Example 3 | 8 | 15 | 0.31 | 43.68 | 14.96 | 58.64 |
| Comparative Example 4 | 18 | 15 | 0.52 | 46.21 | 12.29 | 58.5 |

It can be seen from Table 2;

Compared with the nanofluids in Comparative Examples 1-4, the nanofluids prepared in Examples 1-8 have a lower oil/water interfacial tension, 0.006 mN/m at lowest, and the corresponding nanofluid-displaced oil recovery can reach 25.53%, and the total oil recovery can reach 69.66%, effectively improving the oil recovery in low-permeability reservoirs.

FIG. 6 shows the relationship between the volume of the nanofluids injected into pore and the oil recovery. It can be known from FIG. 6 that the oil recovery after water injection in core samples is about 44%, and the oil recovery is 16.12% after the nanofluid prepared in Comparative Example 1 is injected. After the nanofluid prepared in Example 1 is injected, the increase in the oil recovery is not very obvious compared with Comparative Example 1. However, after the nanofluids prepared in Examples 2 and 3 are injected, the oil recovery is increased to different degrees compared with Comparative Example 1, with the maximum increase of 25.53%, which is due to low oil/water interfacial tension of the nanofluids in Examples 2 and 3, thereby achieving efficient recovery in low-permeability reservoirs.

Finally, it should be noted that the above examples are only used to illustrate the technical solutions of the present disclosure, but not to limit them; although the present disclosure has been described in detail with reference to the above examples, it should be understood by the skilled in the art that the technical solutions described in the above examples can still be modified, or some or all technical features therein can be equivalently replaced; however, these modifications or replacements do not make the essence of the corresponding technical solutions deviate from the scope of the technical solutions of various examples of the present disclosure.

What is claimed is:

1. A preparation method of a functionalized molybdenum disulfide nanosheet, comprising steps below:

1) Mixing a solvent, 1 part by weight of lipoic acid and 5-10 parts by weight of a first compound for 2-4 h to obtain a mixture;

2) Adding 0.05-0.1 parts by weight of 1-hydroxybenzotriazole into the mixture, mixing for 24-48 h, and drying to obtain an intermediate product;

3) Performing ultrasonic treatment or heat treatment on a raw material-solution system to obtain the functionalized molybdenum disulfide nanosheet;

the raw material-solution system comprises 5-10 parts by weight of the molybdenum disulfide nanosheet, 1 part by weight of the intermediate product and saline water;

the first compound contains an ethylene oxide group and an alkylamine chain; and the number of carbon atoms in the alkylamine chain of the first compound is 12-18, and the number of the ethylene oxide group is 2-15.

2. The preparation method of a functionalized molybdenum disulfide nanosheet according to claim 1, wherein in step 3), the ultrasonic treatment includes ultrasonication on the raw material-solution system for 4-12 h and then stirring for 24-48 h;

the heat treatment comprises reacting the raw material-solution system at 60-80° C. for 24-48 h.

3. The preparation method of a functionalized molybdenum disulfide nanosheet according to claim 1, wherein the molybdenum disulfide nanosheet has a layer thickness of 1-1.5 nm, a length of 50-100 nm, and a width of 50-100 nm.

4. The preparation method of a functionalized molybdenum disulfide nanosheet according to claim 2, wherein the molybdenum disulfide nanosheet has a layer thickness of 1-1.5 nm, a length of 50-100 nm, and a width of 50-100 nm.

5. The preparation method of a functionalized molybdenum disulfide nanosheet according to claim 1, wherein the first compound comprises at least one of tallow amine polyoxyethylene ether compound, octadecylamine polyoxyethylene ether compound and coconut amine polyoxyethylene ether compound.

6. The preparation method of a functionalized molybdenum disulfide nanosheet according to claim 2, wherein the first compound comprises at least one of tallow amine polyoxyethylene ether compound, octadecylamine polyoxyethylene ether compound and coconut amine polyoxyethylene ether compound.

7. The preparation method of a functionalized molybdenum disulfide nanosheet according to claim 3, wherein the first compound comprises at least one of tallow amine polyoxyethylene ether compound, octadecylamine polyoxyethylene ether compound and coconut amine polyoxyethylene ether compound.

8. The preparation method of a functionalized molybdenum disulfide nanosheet according to claim 4, wherein the first compound comprises at least one of tallow amine polyoxyethylene ether compound, octadecylamine polyoxyethylene ether compound and coconut amine polyoxyethylene ether compound.

9. A functionalized molybdenum disulfide nanosheet, which is prepared by the preparation method of a functionalized molybdenum disulfide nanosheet according to claim 1.

10. The functionalized molybdenum disulfide nanosheet according to claim 9, wherein in step 3), the ultrasonic treatment includes ultrasonication on the raw material-solution system for 4-12 h and then stirring for 24-48 h;

the heat treatment comprises reacting the raw material-solution system at 60-80° C. for 24-48 h.

11. The functionalized molybdenum disulfide nanosheet according to claim 9, wherein the molybdenum disulfide nanosheet has a layer thickness of 1-1.5 nm, a length of 50-100 nm, and a width of 50-100 nm.

12. The functionalized molybdenum disulfide nanosheet according to claim 9, wherein the first compound comprises at least one of tallow amine polyoxyethylene ether compound, octadecylamine polyoxyethylene ether compound and coconut amine polyoxyethylene ether compound.

13. A nanofluid, comprising the functionalized molybdenum disulfide nanosheet prepared by the preparation method according to claim 1.

14. The nanofluid according to claim 13, wherein in step 3), the ultrasonic treatment includes ultrasonication on the raw material-solution system for 4-12 h and then stirring for 24-48 h;

the heat treatment comprises reacting the raw material-solution system at 60-80° C. for 24-48 h.

15. The nanofluid according to claim 13, wherein the molybdenum disulfide nanosheet has a layer thickness of 1-1.5 nm, a length of 50-100 nm, and a width of 50-100 nm.

16. The nanofluid according to claim 13, wherein the first compound comprises at least one of tallow amine polyoxyethylene ether compound, octadecylamine polyoxyethylene ether compound and coconut amine polyoxyethylene ether compound.

17. The nanofluid according to claim 13, wherein a concentration of the functionalized molybdenum disulfide nanosheet is 10-1000 ppm.

18. The nanofluid according to claim 13, wherein the nanofluid has an oil/water interfacial tension of $10^{-3}$-$10^{-2}$ mN/m.

19. The nanofluid according to claim 13, wherein the nanofluid further comprises one of saline water and deionized water; and the saline water has a concentration of 10000-220000 mg/L.

* * * * *